United States Patent
Clifford

(10) Patent No.: US 7,762,481 B2
(45) Date of Patent: Jul. 27, 2010

(54) ELECTROSTATIC ROTARY ATOMIZER WITH INDIRECT INTERNAL CHARGE

(75) Inventor: Scott J. Clifford, Rochester Hills, MI (US)

(73) Assignee: Fanuc Robotics America, Inc., Rochester Hills, MI (US)

( * ) Notice: Subject to any disclaimer, the term of this patent is extended or adjusted under 35 U.S.C. 154(b) by 276 days.

(21) Appl. No.: 11/745,139

(22) Filed: May 7, 2007

(65) Prior Publication Data

US 2007/0210191 A1    Sep. 13, 2007

Related U.S. Application Data

(63) Continuation-in-part of application No. 11/417,368, filed on May 4, 2006, now Pat. No. 7,622,158, which is a continuation of application No. PCT/US2004/037068, filed on Nov. 4, 2004.

(60) Provisional application No. 60/583,078, filed on Jun. 25, 2004, provisional application No. 60/517,767, filed on Nov. 6, 2003.

(51) Int. Cl.
   *B05B 5/00* (2006.01)

(52) U.S. Cl. .............. 239/706; 239/704; 239/700; 239/690.1; 239/105; 239/291; 239/296

(58) Field of Classification Search .............. 239/690.1, 239/700, 706
    See application file for complete search history.

(56) References Cited

U.S. PATENT DOCUMENTS

| 4,114,564 | A | * | 9/1978 | Probst | 118/626 |
| 4,721,630 | A |   | 1/1988 | Takeo et al. | |
| 4,788,933 | A | * | 12/1988 | Buschor | 118/629 |
| 5,011,086 | A | * | 4/1991 | Sonnleitner et al. | 239/691 |
| 5,039,019 | A | * | 8/1991 | Weinstein et al. | 239/691 |
| 5,106,025 | A | * | 4/1992 | Giroux et al. | 239/703 |
| 6,672,521 | B2 | * | 1/2004 | Reichler | 239/703 |

FOREIGN PATENT DOCUMENTS

| EP | 0 192 338 | 8/1986 |
| EP | 0 885 575 A2 | 7/1998 |
| EP | 1 263 535 B1 | 6/2004 |
| WO | WO 01/68267 A1 | 9/2001 |

* cited by examiner

*Primary Examiner*—Dinh Q Nguyen
(74) *Attorney, Agent, or Firm*—Fraser Clemens Martin & Miller LLC; William J. Clemens

(57) ABSTRACT

An electrostatic rotary atomizer apparatus includes a housing encasing a turbine assembly, a shaping air assembly disposed radially outwardly from the turbine assembly for fluid communication with a shaping air supply, and a charge ring mounted to the housing and adapted to be connected to an electrical power supply. The charge ring has a plurality of electrodes within the housing. Ions emitted by the charge ring are directed through shaping air passages to intersect paint droplets leaving a rotating bell cup.

9 Claims, 1 Drawing Sheet

Figure 1:
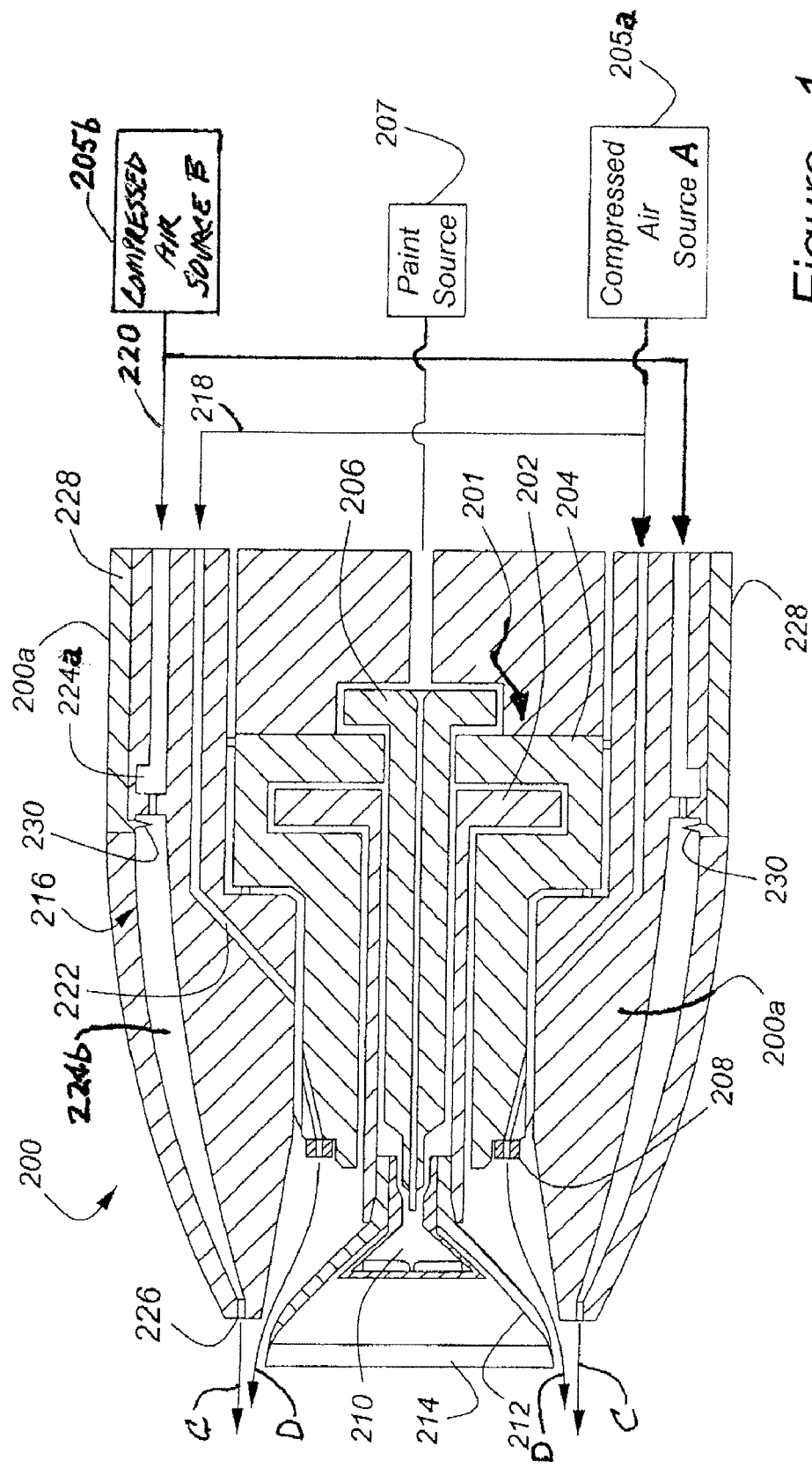

ELECTROSTATIC ROTARY ATOMIZER WITH INDIRECT INTERNAL CHARGE

CROSS-REFERENCE TO RELATED APPLICATIONS

This application is a continuation-in-part of the co-pending U.S. patent application Ser. No. 11/417,368 filed May 4, 2006, which is a continuation of International application no. PCT/US2006/037068 filed Nov. 4, 2004.

This application claims the benefit of U.S. Provisional Application Nos. 60/517,767, filed Nov. 6, 2003, and 60/583,078, filed Jun. 25, 2004.

BACKGROUND OF THE INVENTION

The present invention relates generally to a rotary atomizer for use with paint. More particularly, the invention pertains to an electrostatic rotary atomizer with indirect particle charging for use with water based conductive paints.

It is common practice to charge the paint droplets emitted from a rotary atomizer without directly charging the bell cup. These atomizers are often referred to as indirect or external charge systems and usually entail externally mounted electrodes. Externally charged systems have predominately been used for painting exterior surfaces of automobile bodies but are rarely used for painting the more intricate interior areas of the body. The limitation is primarily due to the size and geometry of the electrode ring.

Recent developments have proposed integrating the electrodes into the outside surface of the bell housing, however some shortcomings still exist. First, the electrodes can be easily contaminated because they attract paint particles and are placed in areas on the outside of the bell in proximity to the atomized cloud of paint particles. Second, the complex geometry of the electrodes does not facilitate easy cleaning and the electrodes are not compatible with automatic cleaning systems (smooth geometry best facilitates automatic cleaning). Third, externally mounted electrodes can be moved in the vicinity of a grounded part, or a portion of the automation which may become partially grounded. The electrode system is then susceptible to discharges, high current draw, or imbalanced charging.

For these reasons, paint application equipment suppliers have moved to direct charge systems, especially for interior waterborne bell painting systems. These direct charging systems generally require loading a volume of paint sufficient to paint the intended part and then isolating the stored volume from ground potential. These types of paint isolation systems are also called voltage blocking devices. Unfortunately, voltage blocking systems suffer from a longer color change time, higher color change waste and have a more complex fluid delivery system due to loading and isolation requirements.

Placing the electrodes inside of the bell housing resolves many of the shortcomings of the indirect external electrode charging and direct charging isolation systems. More specifically, fitting the electrodes in the shaping air supply chamber within the atomizer body will keep the electrodes clean and away from external ground points; furthermore the particle charging will be more uniform and balanced amongst the electrodes. When used in conjunction with water based (conductive) paints, relatively high transfer efficiency can be achieved without requiring external electrodes or a complex voltage blocking system. Many of the benefits of a simple fluid delivery system associated with direct charge solvent based systems can be incorporated into the internal inductive charge system.

An additional benefit can be claimed when using solvent-based paints in addition to water-based paints. In a particular implementation of the ionized air charging method, the charging ring can be insulated. Many of the metallic components are grounded minimizing the atomizer's capacitance. Having minimized capacitance and by hiding the electrodes, the high voltage is less likely to discharge to the grounded part. This particular charging implementation could offer improvements to automatic painting systems whether water based or solvent based paints are used.

SUMMARY OF THE INVENTION

The present invention concerns an electrostatic rotary atomizer apparatus consisting of a housing encasing a turbine assembly, a shaping air assembly disposed radially outward from the turbine assembly and in fluid communication with a shaping air supply, and a charge ring connected to an electrical power supply and to the shaping air assembly. The charge ring has a plurality of electrodes extending therefrom, the electrodes being operable to charge the paint droplets released from the rotating bell cup.

The benefits of the internal inductive charging method and system, according to the present invention, are particularly useful for (a) painting systems used to spray the interior compartments of automobiles where externally mounted electrodes prohibit suitable articulation of the applicator relative to the surface to be painted; (b) painting systems used to spray the interior compartments of automobiles where the color change time of a direct charge system requires application rates higher than desired or additional equipment is required to make up for the loss in painting efficiency; (c) painting systems utilizing conductive paints where no color change time is allotted, such as waterborne fascia painting systems or automotive body exterior systems utilizing batch painting methods; (d) painting systems using a combination of conductive and non-conductive paints, such as plastic part manufacturers supplying several customers requiring different paint technologies; and (e) automotive body exterior systems where there is a transition period when converting from solvent based paints to the more environmentally friendly water based paints.

DESCRIPTION OF THE DRAWINGS

The above, as well as other advantages of the present invention will become readily apparent to those skilled in the art from the following detailed description of a preferred embodiment when considered in light of the accompanying drawings in which:

FIG. 1 is a cross-sectional view of a rotary atomizer in accordance with the present invention.

DESCRIPTION OF THE PREFERRED EMBODIMENT

The entire disclosures of U.S. Provisional Application No. 60/517,767, filed Nov. 6, 2003, U.S. Provisional Application No. 60/583,078, filed Jun. 25, 2004, and U.S. patent application Ser. No. 11/417,368, filed May 4, 2006 are incorporated herein by reference.

Referring now to FIG. 1, a rotary atomizer in accordance with the present invention is indicated generally at 200. The atomizer 200 includes a generally tubular housing 200*a*. A turbine assembly 201 having a turbine stator 204 is disposed in the housing 200*a* and a turbine rotor 202 is rotatably disposed in the housing 200*a*. The turbine stator 204 and the turbine rotor 202 are grounded. A fluid injector 206 is in fluid communication with a fluid supply, such as a paint source 207, and a seal air distribution ring 208 is in fluid communication with a supply of compressed air 205a, discussed in more detail below. A bell cup distributor 210 and an encircling bell cup 212 having an internal edge 214 are each disposed on a free end of the turbine rotor 202. The bell cup 212 can be constructed of conductive materials, non-conductive materials, or a combination of conductive and insulating materials. A thin insulating coating may be applied to portions of a metal bell cup to improve the charging system.

The atomizer 200 also includes a shaping air assembly 216 disposed radially outward of the turbine assembly 201. The shaping air assembly 216 includes a seal air inlet 218 in fluid communication with the supply of compressed air 205a and a shaping air inlet 220 in fluid communication with a supply of compressed air 205b. The seal air inlet 218 extends to a seal air passage 222 for the turbine assembly 201. The shaping air inlet 220 extends to a shaping air manifold and ionizing air nozzle assembly 224a, which further extends through a passageway 224b to a plurality of shaping air control nozzles 226 spaced about an outlet end of the housing 200a. Seal air D exits the seal air distribution ring 208 and passes between an outer surface of the bell cup 212 and an inner diameter of the housing 200a. A charge ring 228 has a plurality of electrodes 230 extending radially within the passageway 224b. The charge ring 228 is connected to a supply of high voltage electrical power (not shown) for charging the electrodes. The electrodes 230 are preferably needle-like in cross section and extend into the shaping air passageway 224b and, when subjected to high voltage potential, ions break free into the air passageway 224b. The ions pass through the passageway 224b and exit the shaping air control nozzles 226 during operation of the atomizer 200.

A relatively high velocity air is directed through the shaping air control nozzles 226. The shaping air control nozzles 226 direct the ionized air adjacent to the bell cup 212. The turbine rotor 202 and the turbine stator 204 rotate the bell cup 212 and the bell cup distributor 210 at sufficient velocity to atomize the paint. The fluid injector 206 directs the paint supply stream into the center of the bell cup distributor 210. Streams of shaping air flowing in a direction C and seal air in the direction D, along with the geometrical position of the air control orifices, guide the ion stream direction. The forward direction of the air flow makes it difficult for atomized paint droplets to travel rearward and accumulate on the electrodes. Controlling the distance between the electrodes 230 and the grounded elements of the rotary atomizer optimizes the ion generation. Further optimization is achieved by setting the proper high voltage level of the power supply connected to the charge ring 228, providing the proper number of electrodes 230, controlling the geometry of the electrodes 230, and by adjusting the volume and the velocity of the air directed through the shaping or seal air passageways. Insulating material such as a non-conductive labyrinth can be added between the electrodes 230 and the bell cup 212 to optimize the electrostatic field. Various shaping air assemblies 216 can be provided depending on the application method, i.e. shape air flow requirement. Also, the electrodes 230 can be located in the seal air passage 222.

The atomizer 200 is insulated such that electrostatic discharge or electrostatic erosion does not occur. If necessary, a non-conductive turbine rotor 202 and stator 204 can be used in conjunction with a separate grounding device (not shown) to reduce erosion or to provide suitable potential between the bell cup and the electrodes.

The atomizer 200 can operate in a reliable manner with similar maintenance intervals as other automotive painting class rotary atomizers. A solvent and air mixture can be injected into the seal air passage 222 and/or the portions of the shaping air passageway 224*b* to clean the parts of the bell cup 212 and/or the portions of the shaping air assembly 216 that would come in contact with the solvent and air mixture.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An electrostatic rotary atomizer apparatus for atomizing paint into paint droplets comprising:

a hollow atomizer housing having an outlet at which the paint droplets are formed;

a turbine assembly disposed in said housing;

a shaping air assembly disposed in said housing radially outwardly from said turbine assembly, said shaping air assembly having a plurality of shaping air passageways adapted to be in fluid communication with a shaping air supply; and a charge ring adapted to be connected to an electrical power supply and mounted to said housing, said charge ring having a plurality of electrodes, at least one of said electrodes located inside said housing and terminating inside one of said shaping air passageways, whereby when said shaping air assembly is in fluid communication with the shaping air supply and said electrodes are electrically charged, shaping air passing thereby through said shaping air assembly is ionized.

2. The apparatus according to claim 1 wherein said turbine assembly includes a turbine stator and a turbine rotor with a bell cup disposed on an end of said turbine rotor, said shaping air assembly directing the ionized air past an edge of said bell cup.

3. The apparatus according to claim 2 including a seal air passage disposed in said housing for directing seal air past said edge of said bell cup.

4. The apparatus according to claim 3 including a seal air distribution ring adjacent said turbine assembly, said seal air distribution ring being in fluid communication with said seal air passage.

5. The apparatus according to claim 1 wherein said shaping air assembly extends to a plurality of shaping air control nozzles at an outlet opening in said housing.

6. The apparatus according to claim 1 wherein said electrodes have a cross section that is needle-shaped.

7. An electrostatic rotary atomizer apparatus for atomizing paint into paint droplets comprising:

a hollow atomizer housing having an outlet at which the paint droplets are formed;

a turbine assembly disposed in said housing and rotating a bell cup;

a shaping air assembly disposed in said housing radially outwardly from said turbine assembly, said shaping air assembly having a plurality of shaping air passageways adapted to be in fluid communication with a shaping air supply and a plurality of shaping air control nozzles for directing shaping air past an edge of said bell cup, said air control nozzles of said shaping air assembly steering the shaping air and influencing the direction of the atomized paint droplets; and a charge ring adapted to be connected to an electrical power supply and mounted to said housing, said charge ring having a plurality of electrodes, at least one of said electrodes terminating inside one of said shaping air passageways, whereby when said shaping air assembly is in fluid communication with the shaping air supply and said electrodes are electrically charged, the shaping air passing through said shaping air assembly is ionized before the shaping air exits said shaping air control nozzles, and the ionized shaping air is guided through said shaping air passageways and nozzles in order to charge the atomized paint droplets.

8. The apparatus according to claim 7 including a seal air passage disposed in said housing for directing seal air past said edge of said bell cup.

9. The apparatus according to claim 7 wherein said bell cup is formed of at least one of a conductive material and an insulating material.

* * * * *